Aug. 31, 1943.  J. D. MORGAN ET AL  2,328,289
ENGINE LEAKAGE METER
Filed Oct. 29, 1940
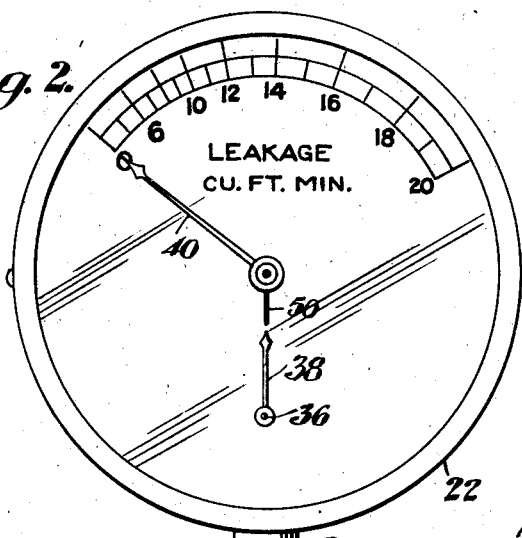
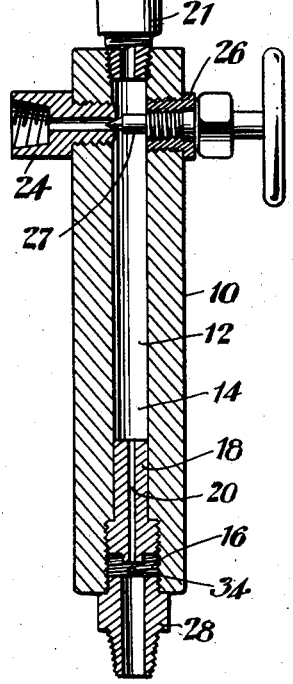
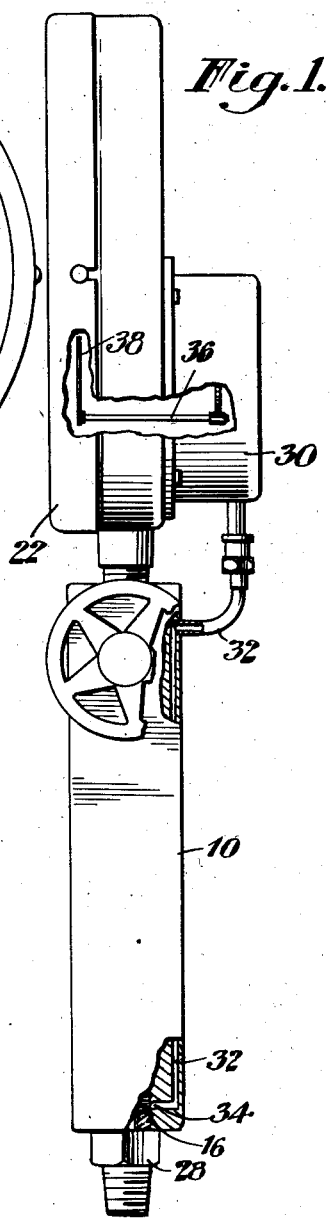
JOHN D. MORGAN
PERCY B. LEVITT
INVENTORS
BY Edmund G. Borden
ATTORNEY Patented Aug. 31, 1943

2,328,289

UNITED STATES PATENT OFFICE 2,328,289

ENGINE LEAKAGE METER

John D. Morgan, South Orange, and Percy B. Levitt, Millburn, N. J., assignors to Cities Service Oil Company, New York, N. Y., a corporation of Pennsylvania Application October 29, 1940, Serial No. 363,256

3 Claims. (Cl. 73—51)

This invention relates to fluid flow measurement, and more particularly to improved apparatus adapted for measuring leakage of gas past the piston and valves of an internal combustion engine cylinder.

The fluid flow measuring means which form the subject of the present invention are improvements on the apparatus and method of operating the same which is described in our U. S. Patent No. 2,003,949, patented June 4, 1935, for "Gas engine leakage tester." The gas leakage tester of our aforesaid patent incorporates features of design which preclude the use of standard fittings and add considerably to the cost of fabrication and assembly. Prior to the development of the present invention there has been, so far as we know, no fluid flow measuring method and apparatus on the market which is adapted for furnishing accurate and easily understood measurements of the rate of gas leakage from an engine cylinder under a constant pressure head.

A primary object of the present invention, is therefore, to provide an improved means for making accurate measurements of the rate of gas leakage from a cylinder of an internal combustion engine.

Another object of the present invention is to provide a fluid leakage meter of such simple design that it can be rapidly and cheaply assembled from standard fittings.

Another object is to provide a fluid leakage meter of such simple calibration as to adapt it for operation by an unskilled operator.

With the above and other objects and features in view, the invention consists in the improved fluid leakage metering means hereinafter described and more particularly defined in the accompanying claims.

In the following description, the invention will be explained by reference to the attached drawing, in which:

Fig. 1 is a view in side elevation, with parts in section, illustrating a preferred design of the fluid leakage meter; and Fig. 2 is a view in front elevation, with the main part of the meter shown in longitudinal section.

In the drawing, 10 designates a tubular housing having a longitudinal cylindrical bore 12. The walls of the housing are threaded internally at each end of the bore, and the interior of the bore is divided into a fluid inlet chamber 14 and a fluid outlet chamber 16 by a removable partition 18. In the drawing that end of the bore 12 in which outlet chamber 16 is located is shown to be of larger diameter than the rest of the bore, and this enlarged section of the bore has walls which are threaded throughout the length thereof. The partition 18 consists of a centrally apertured cylindrical member having an enlarged head with external threads which engage the internal threads at the enlarged end of the bore. The central aperture 20 in the partition 18 provides a flow restricting orifice, normally of about ⅛" diameter, communicably connecting fluid inlet chamber 14 and fluid outlet chamber 16.

At the end of the housing opposite that which is threadably engaged by the partition 18, the threaded end of the bore engages external threads on a tubular connection 21 to a pressure operated flow meter or gauge 22, preferably of the Bourdon tube type. A pair of oppositely disposed wall ports at the fluid inlet chamber end of the housing are threaded for engagement respectively by an externally threaded fluid inlet nipple 24 and by an externally threaded needle valve fitting 26. The needle valve 27 is so dimensioned and mounted in fitting 26 as to form an adjustable closure for the discharge end port in inlet nipple 24.

An externally threaded fluid outlet and adapter nipple 28 is shown as operatively mounted in the threaded outlet chamber end of the housing 10. A pressure gauge 30 (Fig. 1) is mounted with the front of its housing bolted to the back of gauge 22, and has a tubular connection 32 which is ported out at 34 into fluid outlet chamber 16. The gauge 30 is provided with an extra long pinion shaft 36 for its indicating needle 38; shaft 36 extending forwardly through the lower part of the casing for the gauge 22 a distance sufficient to bring needle 38 in front of the indicating dial for gauge 22.

In using the leakage meter for measuring gas leakage past the piston and valves of a cylinder of a four-stroke cycle internal combustion engine, the piston in the cylinder under examination is locked in its top dead center position on compression stroke, at which point of the piston cycle both the intake and exhaust valves are closed. A spark plug is then removed from the wall of the cylinder combustion chamber, and the leakage meter is connected to the combustion chamber and cylinder by screwing adapter 28 into the spark plug socket. A source of compressed air under a pressure preferably in excess of 100 lbs. per square inch, is then connected to the inlet nipple 24, and valve 27 is opened and its position adjusted to maintain the pressure in the outlet chamber 16 at the downstream side of orifice 20 of the meter at a constant pressure of say 50 lbs. gauge. Needle 38 of the gauge 30 connected to chamber 16 will indicate delivery of air to the engine combustion chamber and cylinder from chamber 16 at the optimum test pressure when it swings into alignment with pressure mark "50" on the lower face of gauge 22.

If there were no leakage from the engine valves and cylinder under test, the pressure in chamber 14 of the meter would equal the pressure in chamber 16 of the meter, and needle 38 of gauge 30 would be aligned with point "50" of its scale when needle 40 of gauge 22 aligns with the zero point on its scale, indicating 50 lbs. pressure in both the inlet and outlet chambers of the meter, or would indicate no leakage from the combustion chamber under test. There is always some gas leakage from the engine valves and cylinder at the test pressure employed, however, and this leakage from the engine valves and cylinder results in a differential pressure between the chambers 14 and 16 of the meter. In other words, in order to make up for the leakage and maintain a constant pressure of 50 lbs. in the discharge chamber 16, valve 27 has to be adjusted to maintain a pressure in excess of 50 lbs. in chamber 14. The greater the pressure differential between these two gauge chambers, the greater is the rate of flow of air past orifice 20 of the meter required to make up gas leakage from the engine combustion chamber and cylinder. The scale of gauge 22 is calibrated to measure the differential pressure directly in terms of rate of air delivered to the engine combustion chamber in cubic feet per minute. For example, the leakage meter illustrated has an orifice 20 which is one inch in length and ⅛ inch in diameter, and is calibrated to deliver air at the rate of approximately 8 cubic feet per minute to the engine cylinder under a pressure differential of 10 lbs., corresponding to 60 lbs. pressure in chamber 14, and 50 lbs. pressure in chamber 16. This rate increases to approximately 14 cubic feet per minute with air at 75 lbs. pressure in chamber 14, and 50 lbs. pressure in chamber 16. Ordinarily an engine cylinder and valves of a combustion chamber having a leakage in excess of approximately 10 cubic feet per minute, at a constant test pressure of 50 lbs. per square inch, require attention to correct such condition.

Having thus described the invention, what is claimed as new is:

1. A fluid leakage meter comprising a tubular housing having a longitudinal cylindrical bore, a cylindrical partition member dimensioned for insertion within said bore to divide the bore into fluid inlet and outlet chambers, said member having a flow restriction orifice therein communicably connecting said chambers, a pair of oppositely disposed apertures in the wall of the inlet chamber, a pressure fluid supply tube fitted in one of said apertures, and a needle valve fitted in said other aperture in position for closing and opening a port at the discharge end of the supply tube, a pressure operated flow gauge having a tubular connection fitted in the inlet chamber end of the bore, a pressure fluid discharge nipple fitted in the discharge chamber end of the bore, and a pressure gauge having a tubular connection ported out in the discharge chamber, said gauges being mounted to incorporate a common indicating dial.

2. A leakage meter for measuring the rate of gas leakage through the valves and around the piston in a cylinder associated with a combustion chamber of an internal combustion engine, which comprises a housing having gas inlet and gas outlet chambers connected by a relatively long tubular gas passageway of relatively small diameter compared to that of said chambers adapted to create a pressure differential between said chambers when gas is flowing therethrough, a valve controlled inlet for admitting gas under pressure to said gas inlet chamber, a gas outlet connection for said gas outlet chamber adapted to be connected in a fluid-tight manner to said combustion chamber for the delivery of gas thereto under pressure, a pressure gage connected into the gas outlet chamber of said housing for indicating a predetermined pressure in said chamber, and a pressure responsive instrument connected into the gas inlet chamber of said housing for indicating the gas leakage rate through said valves and said cylinder of said combustion chamber.

3. A leakage meter for measuring the rate of gas leakage through the valves and around the piston in a cylinder associated with a combustion chamber of an internal combustion engine, which comprises a housing having a longitudinal cylindrical bore divided into gas inlet and gas outlet chambers by a partition containing a tubular gas passageway of approximately one inch in length, said passageway connecting said chambers and being of relatively small diameter compared to that of said chambers and adapted to create a pressure differential between said chambers when gas is flowing therethrough, a valve controlled inlet for admitting gas under pressure to said inlet chamber, a gas outlet connection for said gas outlet chamber adapted to be connected in a fluid-tight manner to said combustion chamber for the delivery of gas thereto under pressure, a pressure gage connected into the gas outlet chamber of said housing for indicating a predetermined pressure therein, a pressure responsive instrument connected into the gas inlet chamber of said housing for indicating the gas leakage rate through said valves and said cylinder of said combustion chamber when a predetermined pressure is maintained in said outlet chamber and said combustion chamber.

JOHN D. MORGAN.
PERCY B. LEVITT.